(No Model.) 7 Sheets—Sheet 3.
M. GARDNER.
MACHINE FOR MAKING CORSET STIFFENINGS.

No. 351,174. Patented Oct. 19, 1886.

WITNESSES
H. U. Adams
C. C. Poole

INVENTOR
Marshall Gardner.
by M. E. Dayton
Attorney (No Model.) 7 Sheets—Sheet 4.

M. GARDNER.
MACHINE FOR MAKING CORSET STIFFENINGS.

No. 351,174. Patented Oct. 19, 1886.

WITNESSES
F. U. Adams
C. C. Poole

INVENTOR
Marshall Gardner
by M. E. Dayton
Attorney (No Model.) 7 Sheets—Sheet 5.
M. GARDNER.
MACHINE FOR MAKING CORSET STIFFENINGS.
No. 351,174. Patented Oct. 19, 1886.

Fig. 13.

Witnesses:
Lorus M. F. Whitehead.
C. C. Poole.

Inventor:
Marshall Gardner.
by M. E. Dayton
Attorney.

(No Model.) 7 Sheets—Sheet 7.

M. GARDNER.
MACHINE FOR MAKING CORSET STIFFENINGS.

No. 351,174. Patented Oct. 19, 1886.

UNITED STATES PATENT OFFICE.

MARSHALL GARDNER, OF AURORA, ILLINOIS, ASSIGNOR, BY DIRECT AND MESNE ASSIGNMENTS, TO JAMES STONE, OF SAME PLACE, ELIZABETH FLORSHEIM, OF CHICAGO, AND ALICE M. BALL, OF AURORA, ILL.

MACHINE FOR MAKING CORSET-STIFFENING.

SPECIFICATION forming part of Letters Patent No. 351,174, dated October 19, 1886.

Application filed January 23, 1886. Serial No. 189,473. (No model.)

*To all whom it may concern:*

Be it known that I, MARSHALL GARDNER, of Aurora, in the county of Kane and State of Illinois, have invented a certain new and useful Machine for Making Corset-Stiffening; and I do hereby declare that the following is a full, clear, and exact description thereof, reference being had to the accompanying drawings, and to the letters of reference marked thereon, which form a part of this specification.

This invention relates to an apparatus for manufacturing a peculiar stiffening for corsets or other garments, which stiffening consists of a series of stiffening-strips of whalebone, bamboo, or other analogous material arranged parallel with each other, and united by one or more layers of cloth or other flexible material—such, for instance, as is shown and described in a prior application, Serial No. 146,738, made by myself and James Stone, October 29, 1884.

The machine illustrated in the accompanying drawings as embodying the invention has been devised more especially for the manufacture of stiffening consisting of parallel "bones" and two layers of cloth secured together over the bones by an adhesive substance, as set forth in said prior application. Said machine embraces a pair of heated rollers, one or both of which are circumferentially grooved, between which rollers the two layers of cloth and the intermediate series of strips are passed for the purpose of pressing the whole together and uniting them into the product described. The machine also embraces various adjunctive devices, such as guides for the several layers of cloth, guides for the interposed strips of bamboo, adjusting devices for regulating the pressure of the rollers, means for protecting the fabric being manufuctured from injury by heat of the rollers whenever it becomes necessary to arrest the machine with the fabric therein, and various other devices, which will be further explained. The apparatus as a whole also embraces a mechanism for applying the paste to the layers of cloth, and a system of guides by which the cloth is directed properly to the machine. As a complete apparatus, it also embraces mechanism for cutting up the product into pieces ready to be inserted in the garment.

The machine is illustrated as being provided with two sets or pairs of compression rollers or cylinders, each roller being provided with an interior gas-heating device to accomplish more perfectly the drying of the product and to fit it to be at once either cut into pieces for use or to be wound upon a roller.

In said drawings, Fig. 6 is an enlarged view in section of the devices which guide into the machine the various parts which enter into the product. Fig. 6$^a$ is a detail perspective view of one of the spring guide-fingers I', shown in Fig. 6. Fig. 7 is a vertical transverse section in the line $x$ $x$ of Fig. 1. Fig. 8 is an enlarged fragmentary section of grooved rollers, showing the fabric between them when said fabric is composed of the outer layers of cloth and a series of duplex stiffening-strips. Fig. 9 is a detail sectional view showing the lower end of the lever for raising and lowering the movable grooved rollers. Fig. 10 represents a section of the fabric which the machine is specially intended to produce. Fig. 14 is an elevation of the rear end of the machine, or that at which the finished product makes its exit, illustrating the cutting device shown in Fig. 13. Fig. 15 is a sectional view of the same, taken upon line x x of Fig. 13. Fig. 16 is a detail elevation showing in side view the devices shown in Figs. 13, 14, and 15 for regulating the movements of the cutting-knife. Fig. 16$^a$ is a detail sectional elevation of the inner face of the hub of the wheel P$^6$, shown in Fig. 16, illustrating the clutch device connecting the shaft P$^3$ with the said wheel P$^6$. Fig. 16$^b$ is a sectional view of the same, taken upon line x x of Fig. 16$^a$. Fig. 16$^c$ is a perspective view of the part $p^5$, shown in Figs. 16$^a$ and 16$^b$. Fig. 17 is an enlarged detail section taken upon line x x of Fig. 16. Figs. 18 and 19 are views illustrating another and a preferred device for operating the knife at desired intervals. Fig. 20 illustrates a modified form of the device, which is hereinafter described.

A A are uprights or standards, arranged opposite each other in one or more pairs, and provided with vertical slots $a\ a$, affording guides for the bearing-boxes B' of the rollers or cylinders B B. In this instance two pairs of cylinders B are present in two sets of standards A, and for greater strength the two standards at each side of the machine are connected by cross-bars $a'$. Said standards rest on a bed, A', having legs A$^2$, the feet of which are bolted to a suitable table. The bearing-boxes of the upper cylinders of each pair are limited in their downward movement by stops $a^2$, of any suitable form, on the standards, but have a possible upward movement, which is opposed by stiff springs B$^2$, the tension of which is adjustable by means of screws B$^3$ B$^3$, passing through arched cross-bars A$^3$ A$^3$, attached to the upper ends of the standards A, and extending over the slots $a\ a$. The bearing-boxes of the lower cylinders of each pair are sustained by rods B$^4$ B$^4$, which rest at their lower ends upon eccentrics C, mounted upon shafts C', having bearings in brackets C$^2$, bolted to the bed A', beneath the latter, these parts being so arranged that by the partial rotation of the shafts the lower cylinders may be raised or lowered, as desired. Any suitable means may be provided for actuating the said shafts, that herein shown consisting of a lever, C$^3$, attached to the end of one of the shafts, and connecting devices between the shafts, whereby the rotary motion given to one shaft by the lever is transmitted to the other shaft. Means are desirably provided for locking the lever in position when the lower cylinders are raised, consisting of a spring-pin, $c$, Fig. 9, mounted in the end of a short arm, $c'$, upon the lever, and adapted to enter a recess, $c^2$, in a segmental arm, $c^3$, bolted to the base A', as clearly shown in Figs. 1, 2, 3, 4, 7, and 9. The said arm $c^3$ is, as shown, provided with a projection or stop, $c^4$, to limit the movement of the lever in lowering the cylinders.

The connecting device for transmitting motion from one of the shafts C' to the other consists, as shown, of a pivoted and sliding lever, C$^4$, connected at its opposite ends with cranks C$^5$ upon the ends of the said shafts at one side of the machine, and provided in its middle portion with a longitudinal slot, $c^5$, having sliding engagement with a block, $c^6$, pivoted upon a bracket, C$^6$, that is bolted to the machine-frame. By this construction a partial rotary movement given to one end of the lever C$^4$ by one crank will obviously be transmitted to the other end of the lever, and will thereby cause a corresponding rotary movement in the other crank and shaft.

The purpose of the construction described in the means for supporting and moving the lever-cylinders is to enable said cylinders to be conveniently raised and lowered in inserting the materials to be operated upon between the upper and lower cylinders, as will hereinafter more fully appear.

Figure 1:
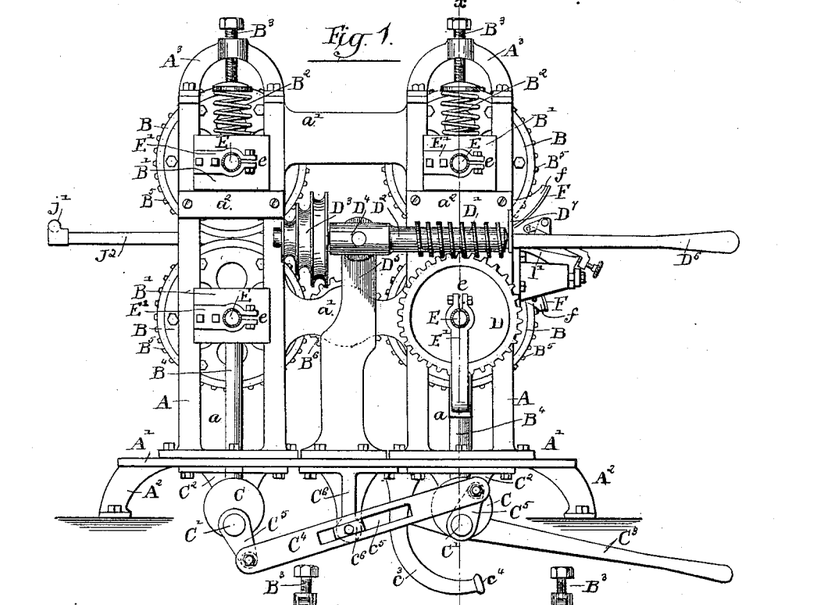
Figure 1 is a side elevation of the machine, showing the driving mechanism and presenting the machine in that view in which the product passes through the machine from right to left.

The several cylinders B are geared together, so as to revolve at the same speed, by means of intermeshing gear-wheels B$^5$ B$^5$ upon the journals or trunnions $b$ of the upper and lower cylinders of each pair, and an intermediate gear-wheel or idler, B$^6$, Fig. 1, located between the gear-wheels B$^5$, belonging to the two lower cylinders. Motion may be communicated to the cylinders for driving the latter in any convenient manner, a preferred construction for this purpose being herein shown, in which a a worm-wheel, D, is mounted upon the shaft of one of the lower cylinders, and is engaged with a worm, D', upon a horizontally-arranged shaft, D$^2$, provided with suitable belt-pulleys, D$^3$, the said shaft D$^2$ having bearing in a sleeve, D$^4$, mounted to rotate about a vertical axis upon a standard, D$^5$, attached to the base A', whereby the said shaft may be swung in a vertical plane, and the worm thereby released from and engaged with the worm-wheel D at will.

Figure 2:
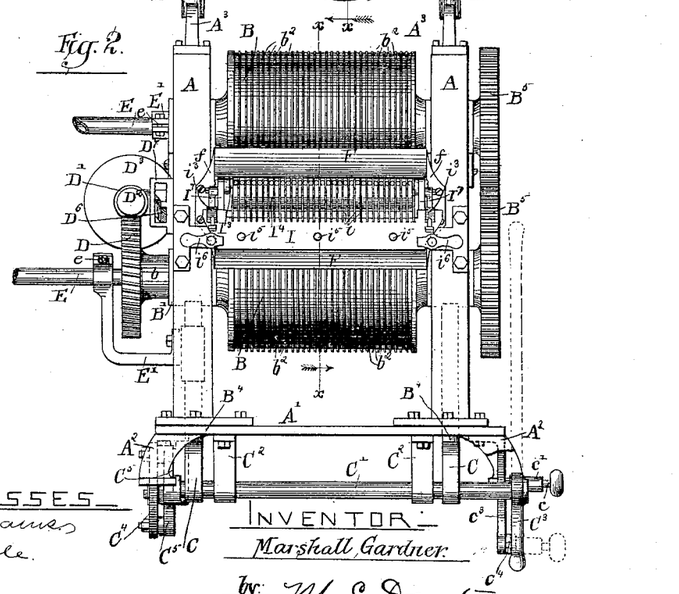
Fig. 2 is an end elevation showing that end of the machine at which the several parts which enter into the product pass into the machine, the gas-heating pipes being shown as protruding at the left and being broken off.

To enable the shaft to be readily moved, as described, a hand-lever, D$^6$, is attached to the sleeve D$^4$, said lever being adapted to spring laterally at its free end and arranged to engage a notched plate, D$^7$, attached to the machine-frame, as clearly shown in Figs. 1 and 2, whereby the lever may be held in a desired position when moved.

Figures 6, 6A, 7, 8, 9, 10, 20:
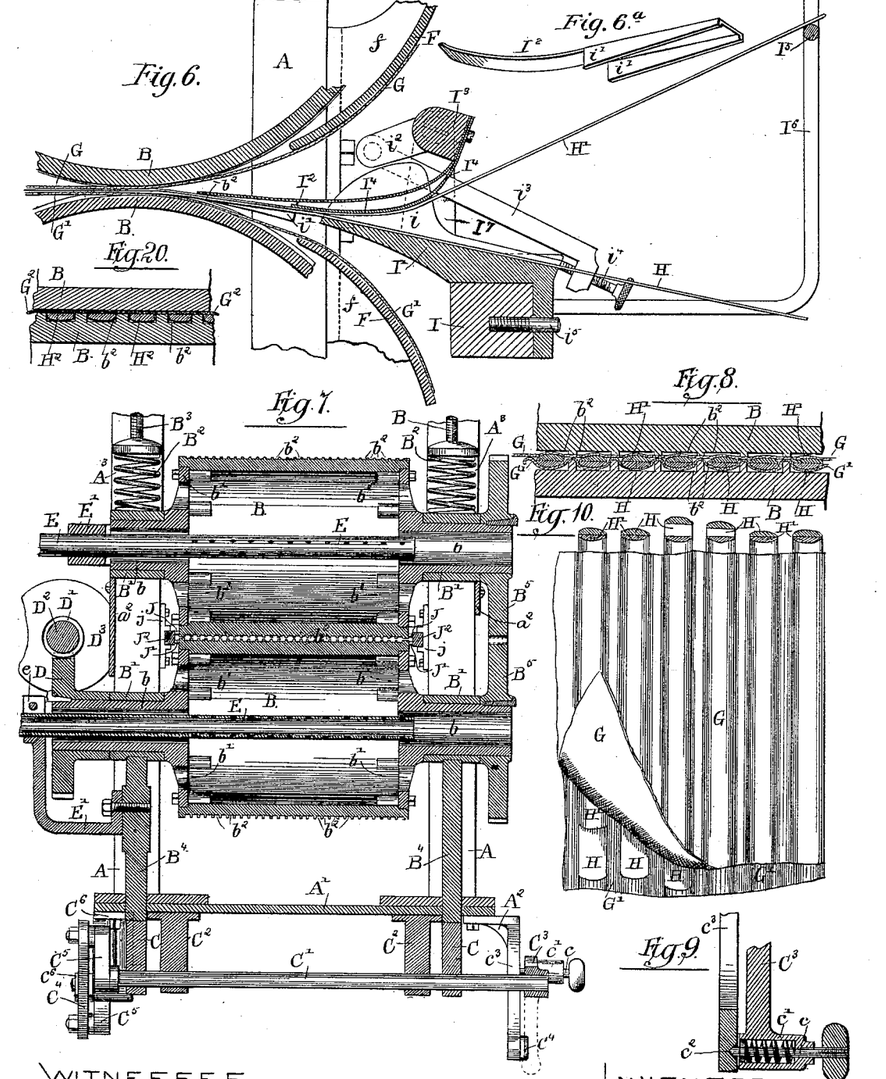

For the purpose of suitably drying the glue or paste by which the parts of the stiffening are united, the cylinders B are made hollow and are provided with interior gas-supply tubes, E, perforated for the exit of the gas, said tubes being inserted through the trunnions $b$, which are made tubular for this purpose, and sustained axially within the cylinders by means of arms or brackets E', Figs. 1, 2, and 7, attached to the bearing-boxes B', and preferably provided with clamping devices $e$, of familiar construction, for engaging and holding the gas-tubes. The bracket E', adjacent to the trunnion supporting the worm-wheel D, is secured to the bar B⁴, below the bearing B', as clearly shown in the drawings, Figs. 2 and 7. As herein shown, the cylinders B are made with separate metal heads b', cast integral with the trunnions b, and provided with apertures for supplying air to the interior gas-flame, Fig. 7, said heads being bolted to the cylinders, as shown.

The cylinders B are provided upon their exterior cylindric surface with a series of equidistant circumferential grooves or depressions, $b^2$, located at the same distance apart as desired for the bones in the finished stiffening, the intermediate ribs formed by said grooves being arranged to come together at the lines of contact between the upper and lower rollers of each pair, so as to force into contact with each other the layers of cloth between the stiffening-strips during the passage of the said cloth and strips through the rollers, as clearly shown in Fig. 8. The grooves $b^2$ in the upper and lower cylinders are made of such depth that they together form spaces or apertures of sufficient size to admit the passage of the strips at the line of contact of the cylinders, the grooves in the upper cylinders, as herein shown, being shallower than those in the lower cylinders, so that the grooves or depressions between the strips are made deeper, and the stiffening is given a more corrugated appearance upon one side than the other. This construction will usually be employed in order that the corset or other garment to which the stiffening is applied may be approximately smooth upon one side; but in carrying out the invention the depression of the cloth between the strips may be greatest upon one side or the other, or equally upon both sides or wholly upon one side, as desired.

Figure 3:
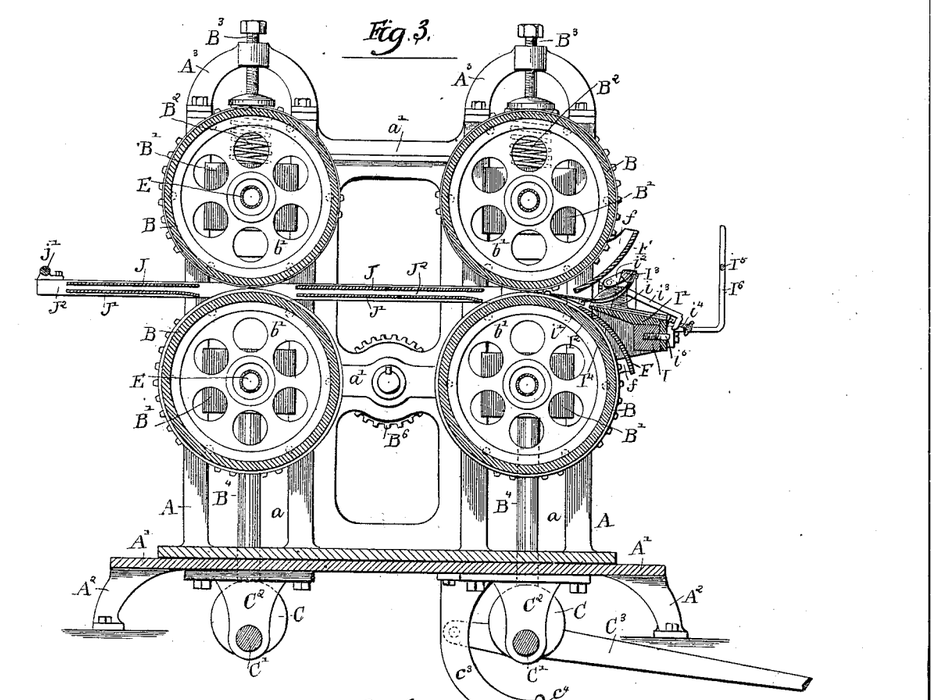
Fig. 3 is a central vertical section taken through the line $x$ $x$ of Fig. 2.
Figures 4, 5:
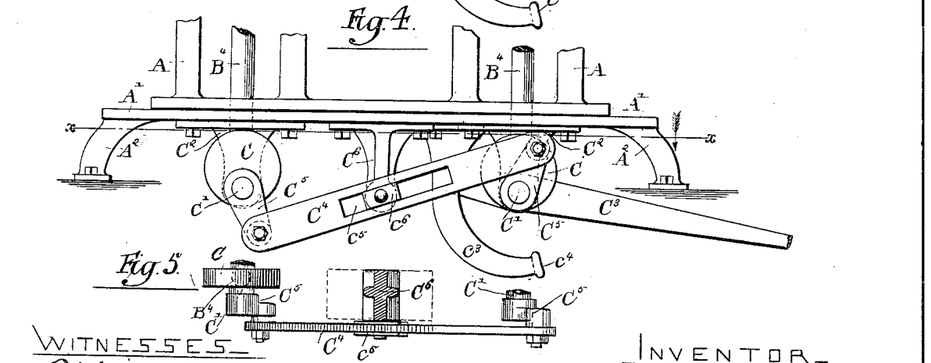
Fig. 4 is an enlarged view in side elevation of the devices by which movable grooved rollers or cylinders are raised and lowered.
Fig. 5 is a horizontal section taken in the line $x$ $x$ of Fig. 4, looking downward.
Figure 13:
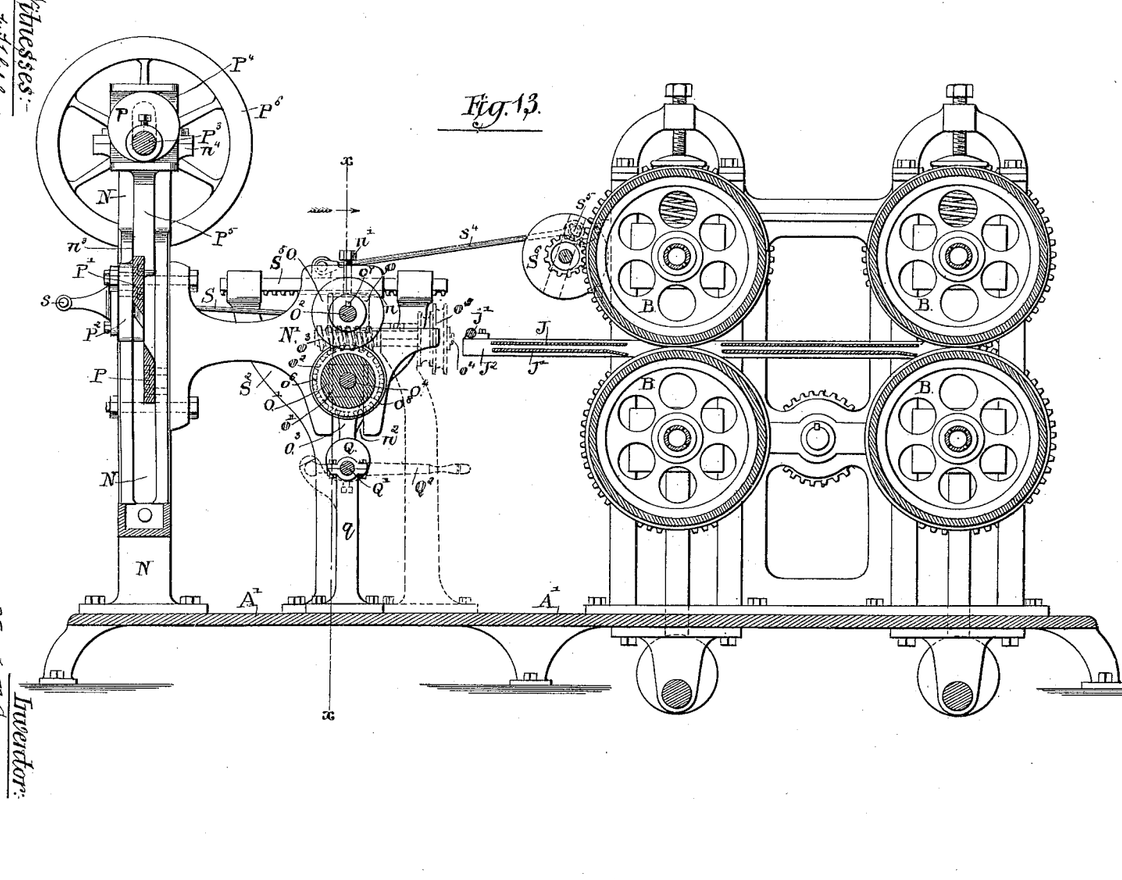
Fig. 13 is a sectional view taken transversely through the grooved rollers of the machine, illustrating in connection therewith an automatic cutting device for severing the finished product as it issues from the rollers into pieces of suitable size for use in garments, the section of the cutting device being taken upon line x x, Fig. 14.

F F, Figs. 1, 2, 3, and 6, indicate curved guides or guards, over which the two layers of cloth (indicated by G G') are trained in their passage to the pair of cylinders B, between which the cloth and stiffening-strips first pass in the operation of the machine, these being the cylinders shown at the right hand in Figs. 1, 3, and 13. Said guards F consist, as herein shown, of curved metal plates, which are attached at their ends to the machine-standards A A by brackets or arms $f\ f$, bolted to the said standards. The principal purpose of said guards F is to hold the cloth from contact with the heated cylinders until the several parts are about to be brought together between the latter.

The machine herein shown is more especially adapted for the manufacture of stiffening of the character above described of that class in which the stiffening strips are made of bamboo splints arranged in two thicknesses or layers, and said machine is provided with guide devices adapted to bring the separate splints or layers into proper relative position, and to direct the duplex strips between the layers of cloth and into place in the grooves of the cylinders. To these ends the said guide devices are constructed as follows:

I is a rigid horizontal cross-bar, attached at its ends to the frame-pieces A A, and supporting between the guide plates F the several parts which operate to guide the strips.

I' is a guide-plate attached to the bar I, and extending inwardly toward the meeting-line of the cylinders B B, said plate being provided upon its upper surface with a series of upwardly-projecting guide-plates, $i$, arranged side by side and adapted to separate and laterally confine the several strips in their passage toward the cylinders. As herein shown, the guide-plates $i$ are attached to the plate I' by having their lower edges inserted in grooves formed transversely in said plate I'; but said guide-plates $i$ may in practice be otherwise secured to the plate I', as found desirable or convenient.

The parts indicated by $I^2$ are a series of spring guide-fingers attached at their outer ends to a cross-piece, $I^3$, which is sustained above and parallel with the plate I, the said fingers extending inwardly between the adjacent surfaces of the upper and lower cylinders. Said fingers are provided at their inner ends with depending flanges or wings $i'$, engaging the opposite sides of the strips and resting at their lower edges upon the surface of the lower cylinder at both sides of the grooves $b^2$ therein, so as to guide the strips accurately into said grooves $b^2$, the extremities of said guide fingers being held forcibly in contact with the lower roller, so as to press or force the strips into the grooves of the said lower roller, together with the cloth carried to said lower roller over the lower guide-plate, G', as clearly shown in Fig. 6.

$I^4\ I^4$ are a second series of spring-fingers attached to the bar $I^3$, over the fingers $I^2$, and extending inwardly over the plate I' and terminating short of the ends of the fingers $I^2$, said spring-fingers $I^4$ being employed for the purpose of pressing downwardly into contact with the lower layers, H, of the stiffening-strips the upper layers, H', at a point above or adjacent to the plate I', the upper strips, H', being kept separate from the lower strips, H, by being guided over a cross-bar, $I^5$, which is sustained by arms or brackets $I^6$ from the machine frame, Fig. 6. The horizontal plate I' and guide-plates $i$ are preferably extended inwardly nearly to the flanges or wings $i'$ upon the fingers $I^2$, and the said plates $i$ are extended upwardly in their inner portions, so as to engage and hold from lateral movement the fingers $I^2$ and $I^4$, and to form lateral guides for the strips extending nearly to the guide-flanges $i'$ of the fingers $I^2$.

To enable the extremities of the fingers $I^2$ and $I^4$ to be adjusted vertically, so that said fingers will act with more or less pressure upon the strips, as desired, the bar $I^3$, to which the fingers are attached, is rotatably supported at its ends in lugs $I^7$ upon the plate I', and is provided with a rigid arm, $i^2$, adjustably connected at its free end with a part of the machine-frame in such manner that the bar $I^3$ may be partially rotated and held in its changed position, for the purpose above stated.

The particular means shown for adjustably connecting the arm $i^2$ with the frame consists of a bar, $i^3$, pivoted at one end to the said arm $i^2$, and provided at its opposite end with a set-screw, $i^4$, adapted to bear upon the front margin of the plate I', as clearly shown in the drawings, Fig. 6.

The plate I' is in the particular construction shown detachably connected with the supporting-bar I, so that said plate and the several parts connected therewith may be removed from the machine, as may be required for cleaning the parts and for other purposes. A convenient means for securing the said plate I' in place is illustrated in the drawings, wherein the bar I is shown as provided with pins $i^5$, which are fitted to apertures in a vertical flange upon the plate I', which flange extends downwardly over the front of the bar I, said plate being held in place by levers or buttons $i^6$, pivoted upon the bar I, near the ends of the latter and adapted to be turned so as to engage the ends of the said flange, as clearly shown in Fig. 2.

In the operation of the parts described the layers G G', previously coated upon their adjacent faces with paste or other adhesive substance, are pressed into contact with each other and with the strips between them by the first pair of rollers, which, as above stated, are heated for the purpose of rapidly drying the paste as the material passes between them. The passage of the stiffening between one pair of cylinders is not, however, usually found to dry the paste sufficiently to permit the immediate cutting or handling of the stiffening. and the second pair of heated cylinders is therefore provided for more thoroughly drying the product.

The stiffening produced by the machine shown is illustrated in section in Fig. 8, and in side view in Fig. 10, G G' in said figures indicating the layers of cloth joining the stiffening-strips, and H H' the separate bamboo splints or layers of which the strips are composed.

To prevent injury to the product by the heat of the cylinders, in case it becomes necessary to arrest the movement of the latter while the stiffening is being formed, horizontal guard-plates J J', Fig. 3, are provided, which are arranged in pairs with one plate of each pair above and the other below the path of the product, said plates being attached at their ends at the sides of the machine to horizontally-sliding bars $J^2$ $J^2$, so arranged that when the cylinders are stopped and the lower cylinders dropped away from the upper ones, the said bars may be moved so as to carry the plates between the cylinders and the stiffening. The bars $J^2$ $J^2$ are mounted to slide in suitable bearings upon the frame-pieces A A, as indicated at $j\ j$, Fig. 7, and are preferably united at their rear ends by means of a rod, $j'$, Figs. 1 and 3, which may be conveniently grasped by the hand in moving the guard-plates. The lower guard-plate, J', between the pairs of cylinders obviously may serve to sustain the stiffening in a horizontal position in its passage from the first to the second of said pairs of cylinders.

Figure 11:
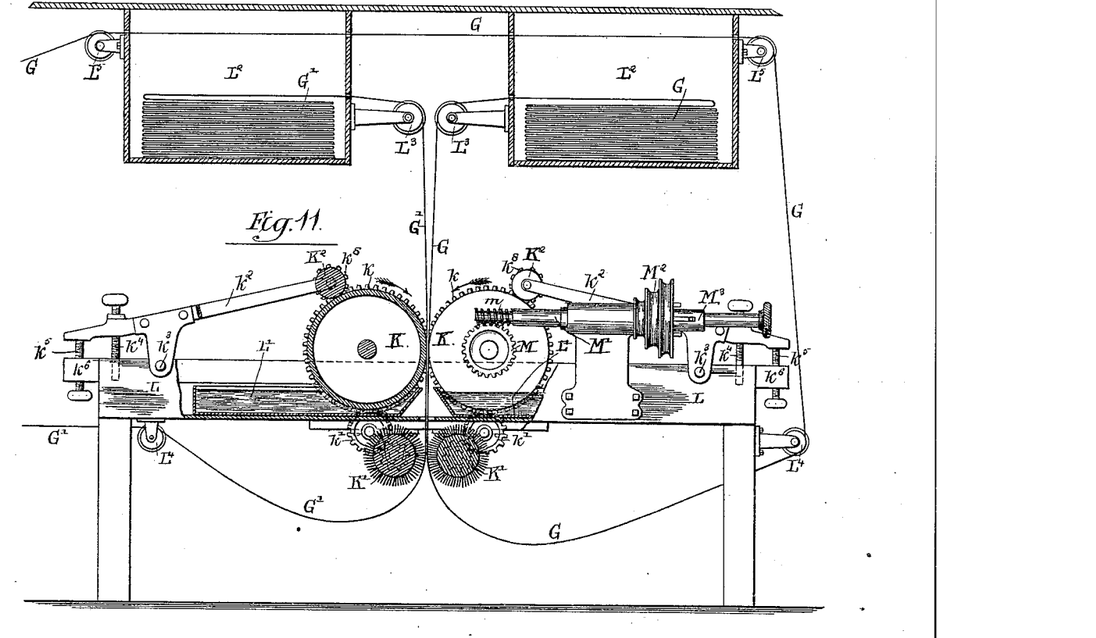
Fig. 11 is a side elevation of the pasting apparatus, showing parts broken away.
Figure 12:
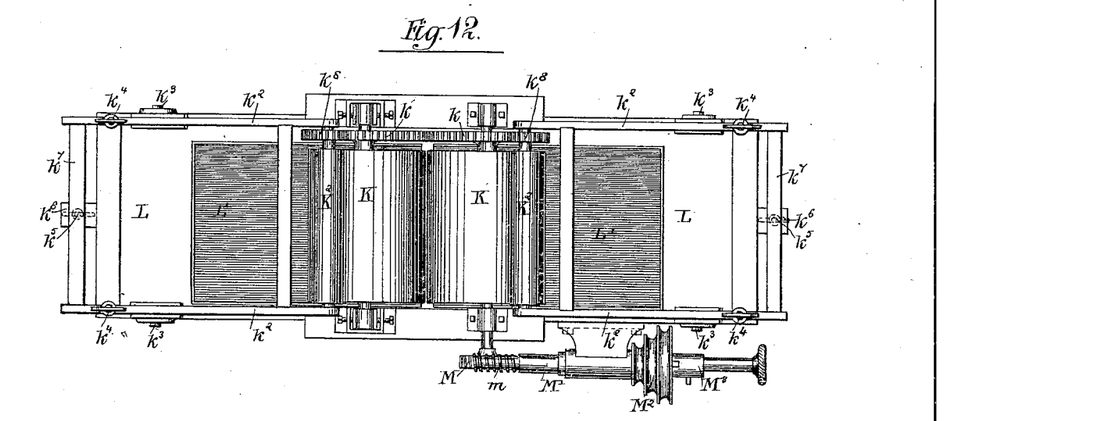
Fig. 12 is a top view of the same.

The apparatus for applying paste to the layers of cloth before they are carried to the cylinders B B is illustrated in Figs. 11 and 12, and constructed as follows: K K are two rotating pasting cylinders or rollers connected by gears $k\ k$, so as to be rotated at the same speed, mounted upon a suitable table or frame, L, and located over two receptacles or pans, L' L', in which is placed paste or other adhesive substance employed for joining the parts of the stiffening. The said rollers are, as shown, driven by a worm, $m$, intermeshing with a worm-wheel, M, applied to the shaft of one of said rollers, the worm being formed upon a shaft, M', provided with suitable belt-pulleys, $M^2$, loosely mounted upon the shaft, and connected therewith by a clutch device of simple form, indicated as a whole by $M^3$ in the drawings. The continuous pieces or webs, G G', of cloth, which form the cloth layers of the stiffening, are drawn from suitable receptacles, $L^2$ $L^2$, or from reels, upon which they may be wound over suitable guide-rollers, $L^3$ $L^3$, located above the pasting-rollers K K, downwardly between said rollers, and then over suitably-located guide-rollers, as $L^4$ $L^5$, to the cylinders B B of the machine, which forms the stiffening, the said cloth webs or layers being brought into contact with each other as they pass between said rollers, so that they are carried forward together by the latter, and each receives at the same time a coating of paste from the said rollers. To prevent the cloth from adhering to the rollers, and to keep it flat and unwrinkled in passing from the latter, cylindric brushes K' K', revolving in the same direction as the rollers K K, are located below the latter in position to bear upon opposite sides of the two layers of cloth. Said brushes are conveniently driven by means of idlers $k'\ k'$, intermeshing with the gear-wheels $k\ k$, and with suitable gears upon the brush-shafts, as shown in Fig. 11. For removing surplus paste from the surfaces of the pasting-rollers K, small rollers $K^2$ $K^2$ are arranged to bear upon the said pasting-rollers, said rollers $K^2 K^2$ being, as herein illustrated, mounted upon arms $k^2\ k^2$, pivoted at $k^3\ k^3$ to the frame L, and sustained in proper position by set-screws $k^4\ k^5$, connecting the outer ends of the levers with the frame, as shown, and serving as a means of adjusting the position of the rollers $K^2$ when found desirable or necessary. The set-screws $k^4$, in the particular construction illustrated, are inserted through the arms $k^2$ and engage a part of the frame L at their lower ends, and the set-screws $k^5$ pass upwardly through blocks $k^6$ upon the frame and abut at their ends against cross-bars $k^7$, uniting the outer ends of the arms $k^2$. The rollers $K^2$ are preferably provided with pinions $k^8$, intermeshing with the gear-wheels $k$ $k$ of the paste-rollers, whereby the said rollers $K^2$ are given a positive rotary motion.

Figures 14, 15, 16, 16C, 17:
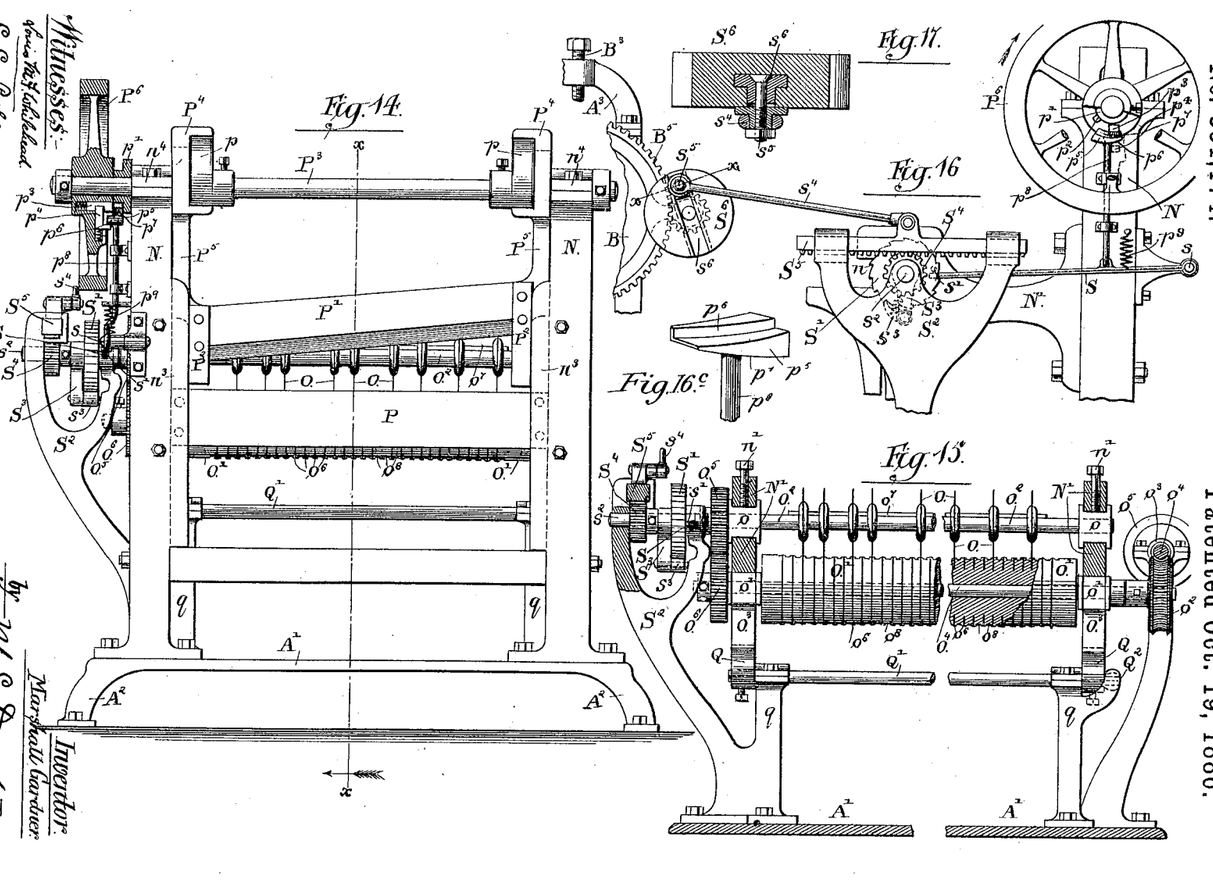

N N, Figs. 13 to 18, indicate the vertical side pieces of the frame of a cutting apparatus. (Shown in the sectional view, Fig. 13, as located upon the base A' in proper position to operate upon the finished stiffening as the latter passes from the rollers B B.) The said cutting apparatus comprises, essentially, a series of revolving cutting-disks, O, and an opposing grooved roller, O', operating to cut or slit the finished stiffening longitudinally into strips of desired widths, and coacting stationary and reciprocating cutters P and P', located at the side of the cutting-disks O, remote from the cylinders B, and operating to cut the strips formed by said cutters O into pieces or batteries of desired lengths. The disk-cutters O are mounted upon a shaft, $O^2$, Figs. 13 and 15, which, together with the grooved roller O', is mounted in side pieces or castings, N', attached to the frame pieces N N. The shaft $O^2$ and roller O' are provided with bearings $o$ $o$ $o'$ $o'$, the bearings $o$ $o$ being secured by set-screws $n'$ $n'$ in laterally-opening recesses $n$ $n$ in the castings N', and the bearings $o'$ being constructed to slide vertically in slots $n^2$ $n^2$, formed in said castings, so as to enable the said grooved roller O' to be separated from the cutting-disks O, as found necessary for adjusting the parts and for other purposes. The said bearings $o'$ $o'$ are sustained by standards $O^3$, which rest at their lower ends upon eccentrics Q Q, mounted upon a shaft, Q', which has bearings in standards $q$ $q$ upon the base A', and is provided with an actuating-lever, $Q^2$, (shown in dotted lines in Figs. 13 and 15,) constructed and operating in the same manner as the lever $C^3$, shown in Fig. 1, and above described. The shaft $O^2$, supporting the cutting-disks, and the shaft $O^4$ of the roller O', are provided with intermeshing gear-wheels $O^5$ and $O^6$, motion for driving the cutting-disks and the opposing rollers being transmitted to the shaft $O^4$ by means of a worm-wheel, $o^2$, fixed to the shaft, and a worm, $o^3$, upon a shaft, $o^4$, provided with belt pulleys $o^5$, as shown in Fig. 15 and in dotted lines in Fig. 13.

The cutting-disks O are made thin in their marginal portions, and sharpened upon their edges in a familiar manner, and are adapted to enter and fit closely in the grooves $o^6$ of the roller O', the said cutting-disks being mounted to move freely longitudinally, but not to rotate upon the shaft $O^2$, so that they are held in proper position laterally solely by their engagement with the said grooves. In the particular construction illustrated the cutting-disks are made of thin sheet metal and provided with central hubs, which are fitted to slide upon the shaft $O^2$, the latter being provided with a spline, $o^7$, engaging suitable notches in the hubs, as clearly shown in the drawings, Figs. 13 and 15. The surface of the roller O' between the grooves $o^6$ is preferably depressed to form a second series of shallow grooves, $o^8$, corresponding in size and distance apart with the grooves $b^2$ of the lower cylinders B B. In the operation of the machine the stiffening passing from the said cylinders and over the roller O' is secured by the cutting-disks acting in connection with the grooves $o^6$ of the said roller along the spaces between the strips.

The lower knife, P, for cutting the stiffening transversely is secured at its ends to the vertical frame-pieces N N, and the movable or reciprocating knife P' is attached at its ends to sliding blocks $P^2$ $P^2$, held and guided in vertical grooves $n^3$, formed in the inner faces of said frame-pieces, the reciprocating knife P' having an inclined cutting-edge, and being arranged to move downwardly past the stationary knife in a familiar manner. The means shown for actuating the knife consists of a shaft, $P^3$, mounted in suitable bearings, $n^4$ $n^4$, at the upper ends of the frame-pieces N N, and provided with eccentrics $p$, engaging yokes $P^4$, attached to the upper ends of vertical bars $P^5$, attached to the blocks $P^2$. The shaft $P^3$ is actuated by means of a belt-pulley, $P^6$, which is mounted loosely upon the shaft, said pulley and shaft being provided with a clutch device, whereby the pulley may be connected with and disconnected from the shaft, so as to cause the operation of the cutter at desired intervals.

A clutch device of familiar form is shown in the drawings, Fig. 14, which is adapted to become automatically disengaged after a single rotation of the pulley and shaft, and after each downward movement of the reciprocating knife P' caused by such rotation. The said clutch comprises a collar, $p'$, mounted upon the shaft adjacent to the hub of the wheel $P^6$, and provided with one or more projections or stops, $p^2$, in its side nearest said hub, a sliding spring-dog, $p^3$, mounted in the said hub in a position parallel with the axis of the shaft and adapted to engage the said stop $p^2$, a second radially-movable spring-dog, $p^4$, adapted to engage a notch in the dog $p^3$, so as to hold the latter in its retracted position and free from the said stop $p^2$, and a movable cam-plate, $p^5$, Figs. 14, 16, $16^a$, $16^b$, and $16^c$, provided with a laterally-inclined cam-face, $p^6$, adapted to engage the end of the dog $p^3$, so as to throw the latter inwardly, and with a second outer inclined or cam-face, $p^7$, Fig. $16^c$, adapted to engage a lateral projection, $p^{10}$, Figs. $16^a$, $16^b$, upon the dog $p^4$, in such manner as to draw the latter outwardly, and thereby release it from engagement with the dog $p^3$, said cam-plate being mounted upon a sliding rod, $p^8$, arranged in suitable bearings upon the frame-piece N radial to the center of the shaft, whereby the cam plate may be moved toward and from the said shaft. The said cam-plate is so constructed and located that when at the inward limit of its movement the inclined surface $p^6$ thereof will be engaged by the dog $p^3$, while the dog $p^4$ will freely pass the cam-surface $p^7$, and when said plate is at the outward limit of its movement the said surface $p^7$ will engage and throw outwardly the dog $p^4$, and the dog $p^3$ will be allowed to pass the plate without contact therewith.

Figures 16A, 16B, 18, 19:
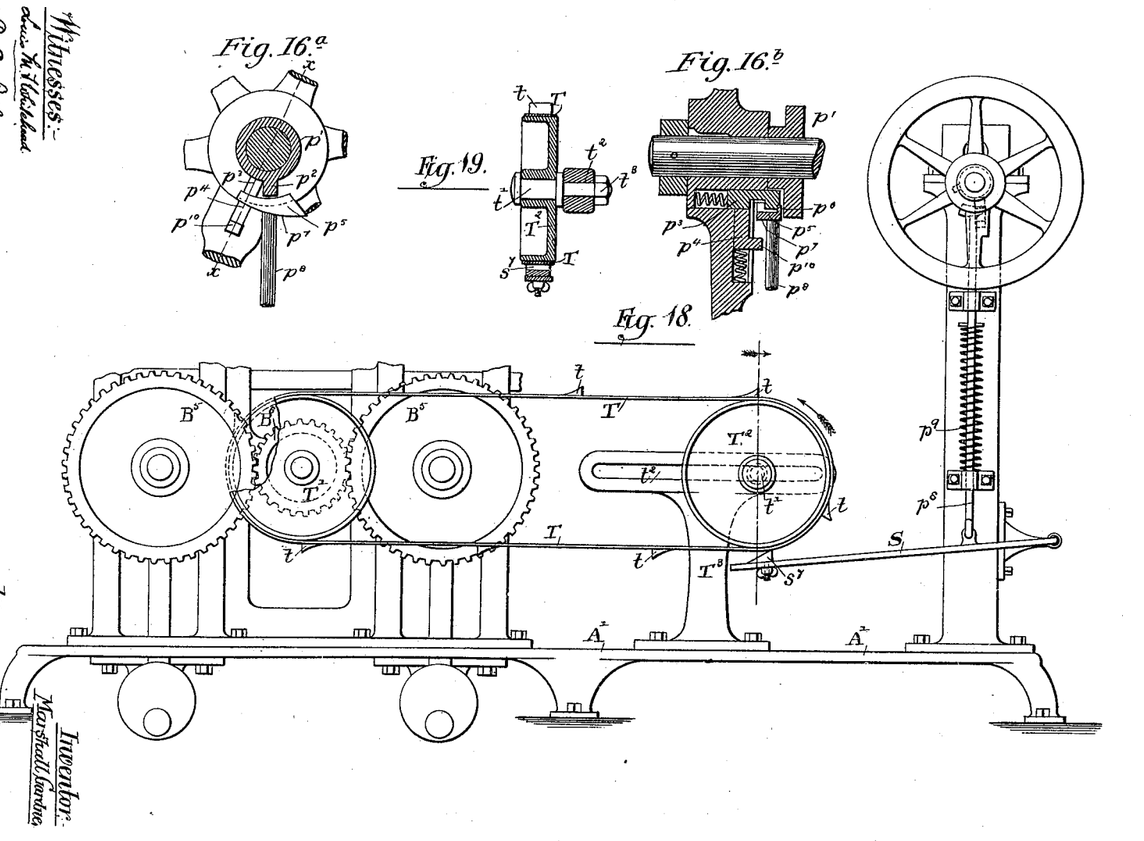

The relative position and operation of the parts above mentioned is more clearly shown in Figs. 16, 16$^a$, and 16$^b$. In Fig. 16 the spring-dog $p^4$ is shown as engaged with the notch in the dog $p^3$, so as to hold the latter at the inward limit of its movement and free from the stop, this being the position of the parts when the wheel $P^6$ is running freely upon the shaft. In Figs. 16$^a$ and 16$^b$ the dogs $p^3$ and $p^4$ are shown in the position maintained by them when the wheel is connected with the shaft and with the cam-plate $p^5$ engaged with the said dog $p^3$, and in its position when about to move said dog for disconnecting the clutch. In this case the dog $p^4$ is held at the outward limit of its movement by engagement with the outer surface of the dog $p^3$, the spring which actuates said dog $p^4$ holding the latter against the said dog $p^3$, so that when the dog $p^3$ is pushed back by the cam-plate said dog $p^4$ will engage the notch of the dog $p^3$. When said dog $p^4$ is at the outward limit of its movement, as above described, the projection $p^{10}$ thereon is free from the cam-plate, which latter will at such time be at the inward limit of its radial movement and in position for the engagement of its lateral cam-surface $p^6$ with the end of the dog $p^3$.

In the operation of the clutch device described the pulley, when rotating freely upon the shaft, as shown in Figs. 14 and 16, is connected with the shaft by drawing the cam-plate $p^5$ outwardly, whereby the outer cam-surface, $p^7$, is caused to engage and draw outwardly the dog $p^4$, so as to release the dog $p^3$ and allow it to spring into position to engage the stop $p^2$. If the cam-plate is then immediately restored to its original position adjacent to the shaft, the end of the dog $p^3$, at the completion of one revolution of the pulley and shaft, will encounter the cam-face $p^6$, as shown in Figs. 16$^a$, 16$^b$, and will be thereby thrust inwardly until free from the pin $p^2$, when it will be engaged and held by the dog $p^4$. A spring, $p^9$, is connected with the rod $p^8$, so as to hold the cam-plate normally in its inward position, so that when the rod is released, after being drawn outwardly to throw the clutch into engagement, the clutch will become automatically disengaged after a single rotation of the shaft. As herein illustrated, the spring $p^9$ is attached at one end to the frame-piece N, and at its opposite end to a horizontal pivoted bar, S, through the medium of which, in the particular construction illustrated, the rod $p^8$ is moved.

One practical means of actuating the rod $p^8$ so as to cause the rotation of the shaft $P^3$ and the operation of the cutter at desired intervals is shown in Figs. 13 to 17. In this case the bar S, which is pivoted at $s$ to the machine-frame, and connected with the rod $p^8$ at a point between its pivotal point and its free end, is adapted to engage at said free end a pin, $s'$, fixed in a revolving ratchet-wheel, S', mounted upon a shaft, $s^2$, having bearings in a suitable frame, S$^2$, and actuated by means of a pawl, $s^3$, mounted upon the end of an oscillating arm, S$^3$. Said arm is attached to a gear-wheel, S$^4$, which latter is actuated by means of a sliding rack-bar, S$^5$, which is given a reciprocating movement through the medium of a rod, $s^4$, connecting said rack-bar with a crank-pin, $s^5$, secured in a rotating disk, S$^6$, actuated by suitable gearing from one of the cylinders B, the said crank-pin $s^5$ being adjustable radially in the disk, so as to enable the throw of the rack-bar, and consequently the extent of rotation of the wheel S' at each revolution of the disk, to be changed as desired. By adjusting the position of said crank-pin the said wheel S' may obviously be given a complete revolution during a greater or less number of rotations of the disk S$^6$, so that the pin $s'$ will engage and move the bar S, and thereby cause the operation of the cutter more or less frequently, according to the length of the pieces it is desired to cut from the stiffening. In the particular construction of the parts illustrated the disk S$^6$ is actuated by a gear-wheel intermeshing with one of the gears B$^5$ of the upper cylinder B, Figs. 13 and 17, and the pin $s^5$ is secured in a T-groove, $s^6$, in the face of the said disk by the familiar construction illustrated in Fig. 17.

Another, and for some reasons a preferred, construction in a device for regulating the length of the pieces or batteries cut from the stiffening by the cutters P P' is illustrated in Figs. 18 and 19. In this case the lever S is depressed at desired intervals to actuate the clutch device by means of a series of knobs or studs, $t$, secured at equal distances apart upon a belt, T, which is trained over two pulleys, T' T$^2$, mounted upon suitable bearings at the side of the machine-frame. In the particular construction illustrated the pulley T' is secured to and revolves with the idler B$^6$, (shown in Fig. 1 as employed to transmit motion from one to the other of the pairs of rollers B B.) and the pulley T$^2$ is mounted upon a stud, $t'$, secured in a horizontal slot, $t^2$, in a bracket or standard, T$^3$, upon the bed A' in such manner that the pulleys T' and T$^2$ may be separated or brought together to provide for longer or shorter belts. The stud $t'$ is, as shown in the drawings, shouldered and provided with a nut, $t^3$, to enable it to be readily moved in the slot $t^2$ and secured in its changed position in the said slot. In the use of this device the frequency with which the cutter P' is operated will obviously be determined by the distance apart of the studs $t$ upon the belt, so that by placing a greater or less number of studs upon the belt or by using belts of different lengths, in case this is necessary in order to enable the studs to be spaced equally at desired distances apart, pieces of stiffening of desired lengths may be accurately cut by the machine. The bar S is in this case desirably provided with a movable projection or stud, $s^7$, arranged in position for engagement with the studs $t$ upon the belt, and adapted to be shifted upon said bar S as found necessary in changing the distance apart of the studs $t$ or the length of the belt and position of the pulley $T^2$. In the construction shown in Fig. 18 the spring $p^9$ is shown as placed around the rod $p^8$, instead of being connected with the bar S, as is the case in the construction illustrated in Figs. 14 and 16.

The device for regulating the operation of the cutters P' (shown in Figs. 18 and 19, and last above described) has important advantages in point of simplicity of construction and operation, and is therefore made the subject of specific claims herein.

It is entirely obvious that the same result as is accomplished by the grooved cylinders B B may be effected by a pair of cylinders, one of which is provided with grooves sufficiently deep to receive the full thickness of the strips, and the other of which is smooth or without grooves, as illustrated in Fig. 20, in which the upper cylinder B is shown as smooth, and the lower cylinder contains a series of grooves, $b^2$. The product in this case will obviously be flat upon one side. It is to be understood, therefore, that the term "grooved cylinders," as employed in the appended claims, covers a pair of cylinders consisting of one grooved and one smooth cylinder, as well as the two grooved cylinders described, and also that said machine may be employed in constructing stiffening in which single strips are secured to one layer instead of between two layers of flexible material, the grooved rollers B B obviously operating, in case only one layer of cloth is present, to hold the strips parallel with each other and to press them into contact with the said layer of cloth in a manner readily understood. In making stiffening of the character last mentioned, opposing rollers—one of which is smooth and the other grooved—will usually be employed, such as is illustrated in Fig. 20, and above referred to, in which is illustrated a stiffening made of single strips H and a single layer of cloth, G.

It has been found that in making the stiffening above described, especially in the use of thin cloth for the layers G G, that paste is liable to strike through the said layers so as to come in contact with the heated rollers, and thereby cause the cloth to stick to said rollers. I have discovered that this difficulty may be remedied by applying a coating of paste to and allowing it to dry upon the cloth before the latter is fed to the machine, the paste being moistened as it passes to the rollers by jets of steam or otherwise. By this means the moist paste is prevented from striking through the cloth by reason of the body of dried paste which fills the latter; but the process mentioned is objectionable, as requiring an additional handling of the material used for the layers, and a better way of avoiding the difficulty mentioned is to prepare the paste by mixing therewith a small quantity of paraffine, which I have found to effectually prevent the cloth from sticking to the cylinders. By this means not only is the necessity of first drying the paste on the cloth and then moistening it avoided, but the paste may be applied by a pasting device, as herein described and shown, whereby the cloth may be pasted and the stiffening completed continuously and by a single operation.

The stiffening-strips employed in making the stiffening, as hereinbefore set forth, will usually be fed to the machine in continuous lengths or strands, formed by securing together, end to end, pieces of the usual length obtainable by glue or otherwise, the stiffening-strips, in the case of bamboo, (the material most commonly used,) usually being obtained in pieces about twelve feet long.

In carrying out my invention as it relates to the machine described, adhesive substances of a kind which do not, like paste or glue, require immediate drying to cause the stiffening to retain its form may be employed, and in such case devices for heating the grooved rollers or for applying heat otherwise to the stiffening may be dispensed with—as, for instance, an adhesive cement having sufficient body or consistency to hold the layers and strips in proper position without being dried may be employed, the cement in such case being allowed to dry after the stiffening is completed; or a rapidly-drying substance may be employed, which will become sufficiently hard to retain the parts in place during the passage of the materials through one or two pairs of rollers—as, for instance, a solution of shellac in alcohol.

I claim as my invention—

1. A machine for making corset-stiffening of the kind which consists of a series of parallel stiffening-strips and layers of cloth uniting said strips, said machine comprising two opposing parts, means producing a pressure of one of said parts against the other part for forcing the layers of cloth into contact with each other between the strips, and means for heating one or both of said parts, one or both of said parts being provided with grooves forming openings or spaces to receive the stiffening-strips, substantially as described.

2. A machine for making corset-stiffening of the character described, comprising two revolving cylinders and means producing a pressure of one cylinder upon the other to force the parts of the stiffening together, one or both of said cylinders being provided with circumferential grooves forming openings or spaces for the strips, and means for heating the said cylinders, substantially as described.

3. A machine for making corset-stiffening of the character described, comprising two revolving cylinders and means producing a pressure of one of said cylinders upon the other for forcing the parts of the stiffening together, one or both of said cylinders being provided with circumferential grooves forming spaces or openings to receive the stiffening-strips, and a series of guides for directing a series of stiffening-strips to the said grooves, arranged to bear on both the side or edges and the flat faces of the strips, whereby said strips are prevented from twisting, substantially as described.

4. An apparatus for making corset-stiffening, consisting of parallel stiffening-strips secured between two layers of cloth, said apparatus comprising two opposing parts and means producing pressure of one of said parts upon the other to force the elements of the stiffening into contact with each other, one or both of said opposing parts being grooved to receive the stiffening-strips, a pasting device for applying paste to one or both of the cloth layers, and means for heating one or both of said opposing parts of the apparatus, whereby the paste is dried while the cloth layers are held together by said opposing parts, substantially as described.

5. In an apparatus for making stiffening, the combination, with means operating to press a layer or layers of cloth into contact with a series of stiffening-strips, of a cutting device operating to sever the product longitudinally and a second cutting device operating to sever the said product transversely into pieces of desired lengths, substantially as described.

6. In an apparatus for making stiffening, the combination, with means operating to press a layer or layers of cloth into contact with a series of stiffening-strips, of a cutting device operating to sever the product longitudinally a second cutting device operating to sever said product transversely, and adjustable means for controlling the operation of the last-mentioned cutting device, whereby pieces of different lengths may be cut from the continuous stiffening, substantially as described.

7. The combination, with two revolving grooved cylinders, B B, and means for heating the cylinders, of stationary guards F F, for holding the layers of cloth from contact with the said cylinders until said layers are brought together between the said cylinders, substantially as described.

8. The combination, with two revolving grooved cylinders, B B, of a series of spring guide-fingers, $I^2$, provided with lateral wings or flanges $i'$, substantially as described.

9. The combination, with two revolving grooved cylinders, B B, of the plate $I'$, provided with a series of transverse guide-plates, $i$, a series of spring guide-fingers, $I^2$, provided with lateral flanges $i'$, and a second series of spring guide-fingers, $I^4$, substantially as described.

10. The combination, with two revolving grooved cylinders, B B, of a series of spring guide-fingers, $I^2$, a rotatable bar, $I^3$, sustaining said guide-fingers $I^2$, and means for adjusting the angular position of the said bar, substantially as described.

11. The combination, with two revolving grooved cylinders, B B, of a plate, $I'$, provided with vertical guides $i$, a series of spring guide-fingers, $I^2$, and a bar, $I^3$, sustaining said guide-fingers and supported upon the plate I, said plate being detachably secured to the machine-frame, whereby the plate and parts connecting therewith may be removed from the machine when desired, substantially as described.

12. The combination, with two revolving grooved cylinders, B B, provided with hollow trunnions $b$ and vertically-movable bearings $B'$, for the said trunnions, perforated gas-tubes E, extending through the said hollow trunnions into the interior of the cylinders, and arms or brackets $E'$, sustaining said tubes from the said bearings, substantially as described.

13. The combination, with the machine-frame and two revolving grooved cylinders, B B, arranged one above the other, of vertically-movable bearings $B'$ for the lower cylinder, supports $B^4$ for said bearings, a rock-shaft, $C'$, provided with eccentrics C, engaged with said supports $B^4$, and a hand-lever attached to said rock-shaft for actuating the latter, and means for locking the said hand-lever when the lower cylinder is lifted, whereby the said lower cylinder may be raised and lowered, as desired, and held immovably in its elevated position, substantially as described.

14. The combination, with two pairs of revolving cylinders, of vertically-movable bearings $B'$ for the lower cylinders, supports $B^4$ for the said bearings, rock-shafts $C'$ $C'$, provided with eccentrics C, engaged with the said supports $B^4$, a hand lever attached to one of said rock-shafts, a locking device for the hand-lever, and operative connections between the said shafts, whereby one is rotated from the other, substantially as described.

15. The combination, with two revolving cylinders, B B, one of said cylinders being movable toward and from the other, so that said cylinders may be separated from each other when desired, of movable guard-plates J $J'$, adapted to enter between the cylinders when the latter are apart, substantially as described.

16. The combination, with two pairs of revolving cylinders, B B, of two sets of guard-plates, J $J'$, and sliding bars $J^2$, sustaining said guard-plates, said plates being arranged at the same distance apart as the pairs of cylinders, whereby when the cylinders are separated both sets of guide-plates may be interposed between the cylinders by moving said bars $J^2$, substantially as described.

17. The combination, with the frame of the machine and two grooved cylinders, B B, mounted therein, of a driving-shaft, $D^2$, provided with belt-pulleys $D^3$, a sleeve, $D^4$, affording bearings for said shaft and rotatably mounted upon the machine-frame, a worm upon the said driving-shaft, and a worm-wheel connected with one of said cylinders, engaged therewith, and a hand-lever, $D^6$, attached to the said sleeve $D^4$, whereby the worm and worm-wheel may be disengaged for stopping the movement of the cylinders, substantially as described.

18. In an apparatus for making corset-stiffening, a pasting device comprising two opposing pasting-rollers, means for supplying paste to said rollers, and means guiding two layers of cloth together between said rollers, whereby paste is applied to both the said layers simultaneously, substantially as described.

19. The combination, in an apparatus for making corset-stiffening, of two revolving grooved cylinders, B B, a pasting device comprising two opposing pasting-rollers, means guiding two layers of cloth together between said rollers and guides, as $L^4 L^5$, located in position to separate the said layers after they have left the pasting-rollers and to direct said layers to the grooved cylinders B B, with their pasted surfaces adjacent to each other, substantially as described.

20. In an apparatus for making corset-stiffening, the combination, with two opposing pasting-rollers and means constructed to guide two layers of cloth together between said rollers, of revolving brush-rollers located at the exit side of the said pasting-rollers and acting upon the opposite sides of the two layers of cloth, substantially as described.

21. In an apparatus for manufacturing corset-stiffening, the combination, with a pair of revolving grooved cylinders, of a pasting device comprising two pasting-rollers located side by side and arranged for the passage of the layers of cloth between them, receptacles $L^2$ for the cloth, guide-rollers $L^3 L^3$, located above the pasting-rollers, for directing the cloth from the said receptacles to the latter, and guide-rollers $L^5 L^5$, located above the pasting device, whereby one of the layers of cloth is carried over or around the pasting device, and the pasted surfaces of both layers are brought together in passing between the cylinders, substantially as described.

22. In an apparatus for manufacturing stiffening, the combination, with two revolving grooved cylinders, B B, a device for severing longitudinally the product passing from the cylinders, located at the exit side of said cylinders, and consisting of a roller, O', provided with a series of narrow grooves, $o^6$, and a series of cutting-disks, O, mounted upon a shaft, $O^2$, and engaging with said grooves $o^6$, the cutting-disks and grooves being located in alignment with the spaces between the grooves of the cylinders B B, substantially as described.

23. The combination, with two revolving grooved cylinders, of a cutting device consisting of a roller, O', provided with a series of grooves, $o^6$, corresponding in position with the grooves of the cylinders B B, and with a second series of narrow grooves, $o^6$, a series of cutting-disks, O, and a shaft, $O^2$, sustaining said disks, substantially as described.

24. The combination, with two revolving grooved cylinders, of a cutting device consisting of a roller, O', provided with a series of grooves. $o^6$, a series of cutting-disks, O, and a shaft, $O^2$, sustaining the disks, said disks being connected with the shaft by a spline upon the shaft engaging grooves in the disks, allowing said disks to move freely longitudinally, but not to rotate upon said shaft, substantially as described.

25. The combination, in an apparatus for making stiffening, of a cutting device for severing the stiffening transversely, comprising a reciprocating knife and driving-connections for operating the knife, embracing a clutch device, and means for operating the clutch device at desired intervals, comprising a traveling belt provided with a series of studs or projections adapted to engage a movable part connected with the said clutch device, substantially as described.

26. The combination, in an apparatus for making stiffening, of a cutting device for severing the stiffening transversely, comprising a reciprocating knife, driving-connections for actuating the knife, embracing a clutch device, and means for operating said clutch device, comprising a traveling belt provided with a series of projections or studs adapted to engage a movable part connected with the clutch device, and pulleys supporting said belt, one of which is movable relatively to the other, substantially as described.

27. The combination, in an apparatus for making stiffening, of a cutting device for severing the stiffening with two revolving cylinders transversely, comprising a reciprocating knife and driving-connections for actuating the knife, comprising a clutch device, a pivoted lever, S, connected with and actuating said clutch device, a traveling belt, T, provided with studs or projections $t$, engaging the lever S, and two pulleys sustaining said belt, one of said pulleys being driven from one of the said cylinders, substantially as described.

28. In an apparatus for manufacturing stiffening, the combination, with two revolving cylinders, of a device for cutting the product passing from said cylinders transversely, comprising a stationary and a reciprocating knife, a shaft through the medium of which the reciprocating knife is actuated, a belt-pulley mounted to rotate freely upon the shaft, a clutch device of that kind constructed for automatic disengagement after a single rotation of the shaft connecting said pulley with the shaft, and means, substantially as described, operated by the grooved cylinders and constructed to actuate the said clutch device at desired intervals, substantially as described.

29. The combination, with two revolving cylinders, of a cutting device comprising a reciprocating knife and means for actuating the knife, comprising a clutch device, a pivoted lever, S, connected with and actuating said clutch device, a traveling belt, T, provided with studs $t$, and two pulleys sustaining said belt, the said lever S being provided with a projection or lug, $s^7$, longitudinally adjustable upon the lever, substantially as described.

30. An apparatus for making corset-stiffening and cutting the same into lengths by a continuous operation, said apparatus comprising means for applying an adhesive substance to a continuous strip or strips of cloth, means operating to press together the strip or strips of cloth, and a series of parallel stiffening-strips of bamboo or similar material, and means controlled by the movement of the pressing devices operating to cut the stiffening into short lengths.

31. An apparatus for making corset-stiffening and cutting the same into lengths by a continuous operation, said apparatus comprising means for applying an adhesive substance to a continuous strip or strips of cloth, means operating to press together the strip or strips of cloth and a series of parallel stiffening-strips of bamboo or similar material, and means operating to sever the stiffening longitudinally between the strips after the parts composing the stiffening have been secured together.

In testimony that I claim the foregoing as my invention I affix my signature in presence of two witnesses.

MARSHALL GARDNER.

Witnesses:
SAM ALSCHULER,
J. P. CASS.